US011201570B2

(12) United States Patent
Ito et al.

(10) Patent No.: US 11,201,570 B2
(45) Date of Patent: Dec. 14, 2021

(54) VIBRATION WAVE MOTOR AND OPTICAL DEVICE

(71) Applicant: CANON KABUSHIKI KAISHA, Tokyo (JP)

(72) Inventors: Hiroki Ito, Hiratsuka (JP); Yasufumi Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 733 days.

(21) Appl. No.: 15/934,836

(22) Filed: Mar. 23, 2018

(65) Prior Publication Data

US 2018/0287516 A1    Oct. 4, 2018

(30) Foreign Application Priority Data

Mar. 28, 2017 (JP) .............................. JP2017-063102
Jan. 18, 2018  (JP) .............................. JP2018-006553

(51) Int. Cl.
*H02N 2/14* (2006.01)
*H02N 2/02* (2006.01)
*H02N 2/00* (2006.01)
*H02N 2/04* (2006.01)
*H02N 2/16* (2006.01)

(52) U.S. Cl.
CPC ........... *H02N 2/142* (2013.01); *H02N 2/0055* (2013.01); *H02N 2/0065* (2013.01); *H02N 2/026* (2013.01); *H02N 2/04* (2013.01); *H02N 2/163* (2013.01)

(58) Field of Classification Search
CPC .... H02N 2/142; H02N 2/0055; H02N 2/0065; H02N 2/026; H02N 2/04; H02N 2/163

USPC ....................................... 310/323.01–323.21
See application file for complete search history.

(56) References Cited

U.S. PATENT DOCUMENTS

2012/0248934 A1* 10/2012 Kojima ................ H02N 2/0015
                                              310/323.16
2014/0285066 A1*  9/2014 Yamamoto ............. H02N 2/026
                                              310/323.02
2016/0127623 A1*  5/2016 Shimada ................. G02B 7/08
                                              348/360

(Continued)

FOREIGN PATENT DOCUMENTS

CN       101567644 A     10/2009
CN       104065298 A      9/2014
(Continued)

*Primary Examiner* — Derek J Rosenau
(74) *Attorney, Agent, or Firm* — Canon U.S.A., Inc., IP Division

(57) ABSTRACT

A vibration wave motor comprises a vibrator including a piezoelectric element and a vibrating body, a friction member including a first surface configured to come into contact with the vibrator, and a second surface, which is a surface on the opposite side of the first surface, the vibrator and the friction member moving relative to each other in a driving direction by a vibration generated by the vibrator, a supporting member configured to support the friction member on the second surface side; and a pressure member configured to bring the vibrator and the friction member into pressure contact with each other. A fixing portion configured to fix the friction member to the supporting member is provided in the friction member. The vibrator can move to a position where at least part of the vibrator and the fixing portion overlap each other in a pressure direction of the pressure member.

8 Claims, 14 Drawing Sheets

(56) References Cited

U.S. PATENT DOCUMENTS

2016/0352257 A1* 12/2016 Oikawa ................ H02N 2/0065

FOREIGN PATENT DOCUMENTS

| | | |
|---|---|---|
| CN | 106059384 A | 10/2016 |
| EP | 2112551 A2 | 10/2009 |
| JP | 2014-236522 A | 12/2014 |
| JP | 2015-065809 A | 4/2015 |
| JP | 2016-92911 A | 5/2016 |
| JP | 2017-22957 A | 1/2017 |

* cited by examiner

VIBRATION WAVE MOTOR AND OPTICAL DEVICE

BACKGROUND OF THE INVENTION

Field of the Invention

The present disclosure relates to a vibration wave motor and an optical device including the vibration wave motor.

Description of the Related Art

For example, as a driving source for a lens of a camera, an ultrasonic motor is employed, taking advantage of its features such as a silent operation, the capability to be driven from low speed to high speed, and high torque output. The publication of Japanese Patent Application Laid-Open No. 2016-92911 discusses an ultrasonic motor in which a sliding portion of a vibrator comes into friction contact with a slider to cause the vibrator to generate a vibration, thereby driving the vibrator relative to the slider.

In the ultrasonic motor discussed in the publication of Japanese Patent Application Laid-Open No. 2016-92911, the slider is supported by a unit supporting member. The unit supporting member supports both end portions in the driving direction of the slider and the surface of the slider on the side where the vibrator comes into friction contact with the slider. Thus, to avoid interference between the vibrator and the unit supporting member, it is necessary to place the unit supporting member outside the range of movement in the driving direction of the vibrator. This prevents downsizing of the driving direction.

SUMMARY OF THE INVENTION

According to an aspect of the present disclosure, a vibration wave motor includes a vibrator, a friction member including a friction contact surface configured to come into contact with the vibrator, and a back surface, which is a surface on the opposite side of the friction contact surface, and a supporting member configured to support the friction member, the vibrator and the friction member move relative to each other in a driving direction by a vibration generated by the vibrator, the vibrator includes a contact portion configured to come into contact with the friction contact surface of the friction member, the friction member includes a fastening hole through which a fastening member for fixing the friction member to the supporting member is inserted, the fastening hole is placed so that in a state after the vibrator and the friction member move relative to each other by the largest amount, the fastening hole is located between the contact portion of the vibrator and an outermost portion in the driving direction of a unit configured to move integrally with the vibrator, and the fastening member is inserted into the fastening hole from the back surface side of the friction member.

Further features will become apparent from the following description of exemplary embodiments with reference to the attached drawings.

DESCRIPTION OF THE EMBODIMENTS

Exemplary embodiments will be described below with reference to the attached drawings.

Figure 1:
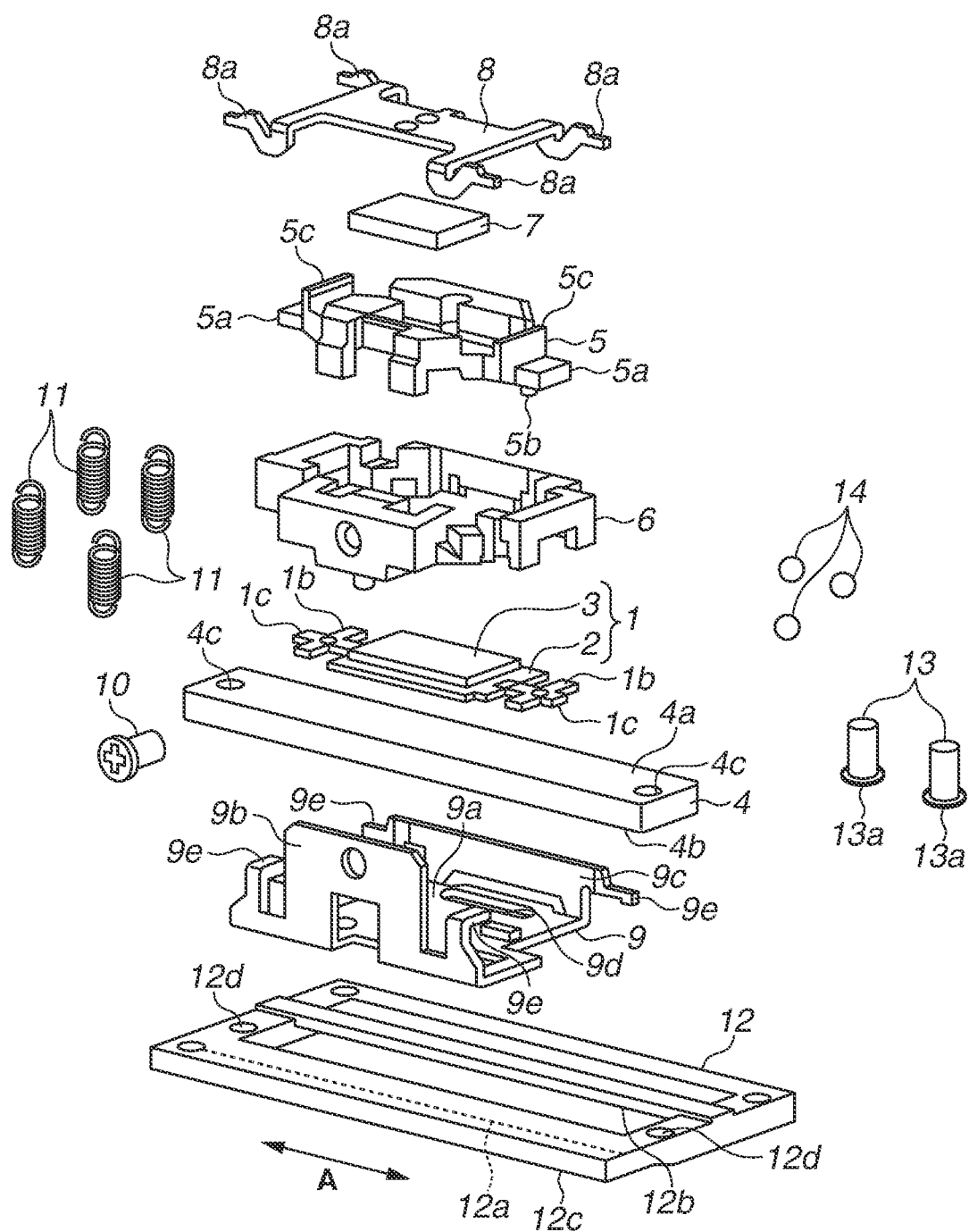
FIG. 1 is an exploded perspective view illustrating an ultrasonic motor according to a first exemplary embodiment.
Figure 2:
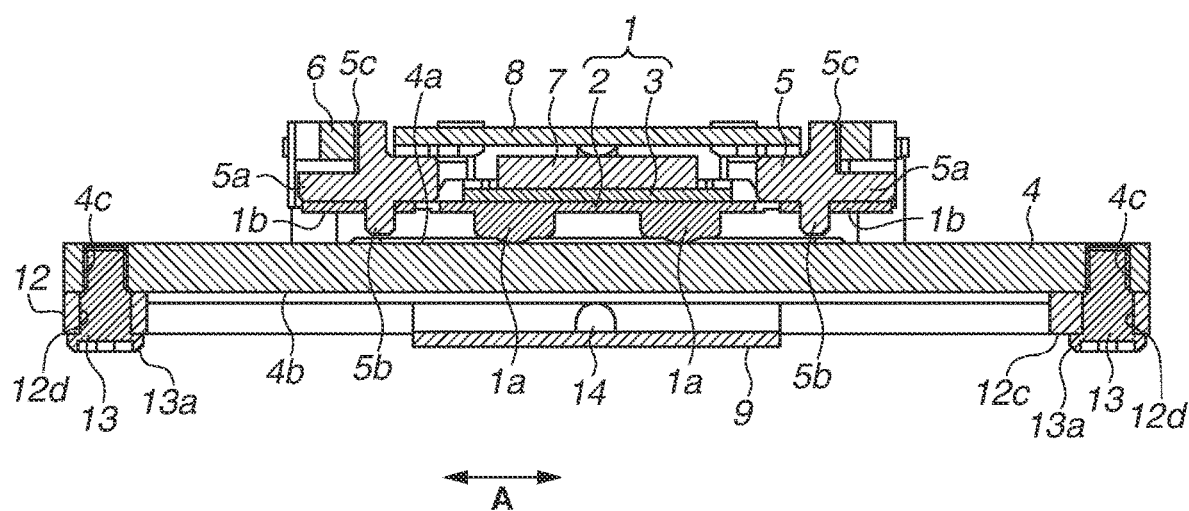
FIG. 2 is a cross-sectional view of the ultrasonic motor according to the first exemplary embodiment, taken along a driving direction.

A first exemplary embodiment is described below. FIG. 1 is an exploded perspective view schematically illustrating an ultrasonic motor, which is a vibration wave motor, according to the first exemplary embodiment. FIG. 2 is a cross-sectional view of the ultrasonic motor according to the first exemplary embodiment, taken along a driving direction A. A vibrator 1 includes a long plate-like vibrating body 2 and a piezoelectric element 3, which is joined to the vibrating body 2. A long plate-like friction member 4, which is also termed a slider, includes a friction contact surface 4a (a first surface), which comes into contact with the vibrator 1, and a back surface 4b (a second surface), which is a surface on the opposite side of the friction contact surface 4a. Although the details will be described below, an ultrasonic vibration by the piezoelectric effect of the vibrator 1 is converted into a linear motion, whereby the vibrator 1 and the friction member 4 can move relative to each other in the longitudinal directions of the vibrator 1 and the friction member 4 as a driving direction A.

A frame-like holding member 5 holds the vibrator 1. The holding member 5 is placed within a frame-like power transmission member 6 and assembled to the power transmission member 6 via fitting portions 5c without backlash in the driving direction A. An intervening member 7 is placed within the holding member 5 and comes into contact with the piezoelectric element 3 of the vibrator 1. A pressure member 8 is placed on top of the intervening member 7. A guide member 9 is placed on the opposite side of the holding member 5 and the power transmission member 6 across the vibrator 1 and the friction member 4 and assembled to the power transmission member 6 with a male screw 10. Tension springs 11, which are elastic members, are engaged with hitch portions 8a of the pressure member 8 and hitch portions 9e of the guide member 9 and apply biasing forces in the direction in which the pressure member 8 and the guide member 9 come close to each other. The vibrator 1 is pressurized by the pressure member 8 via the intervening member 7 and comes into contact with the friction contact surface 4a of the friction member 4 in a pressure contact state.

A frame-like base member 12, which is a supporting member, supports the back surface 4b of the friction member 4. Both end portions in the longitudinal direction of the friction member 4 (the driving direction A) are fastened and fixed to the base member 12 with male screws 13, which are fastening members. Although FIG. 1 illustrates the guide member 9 above the base member 12, the guide member 9 is placed on a back surface 12c side of the base member 12, and wall portions 9b and 9c and hitch portions 9e protrude upward from inside the base member 12. Although the details will be described below, the base member 12 guides the guide member 9 in the driving direction A via balls 14, which are rolling members.

In the ultrasonic motor having such a configuration, the vibrator 1, the holding member 5, the power transmission member 6, the intervening member 7, the pressure member 8, the guide member 9, the tension springs 11, and the male screw 10 form a unit for moving integrally with the vibrator 1 (hereinafter referred to as "a unit including the vibrator 1"). The unit including the vibrator 1 moves relative to the friction member 4 and the base member 12, which supports the friction member 4, in the driving direction A.

The details of the components of the ultrasonic motor according to the first exemplary embodiment are described below.

Figure 3:
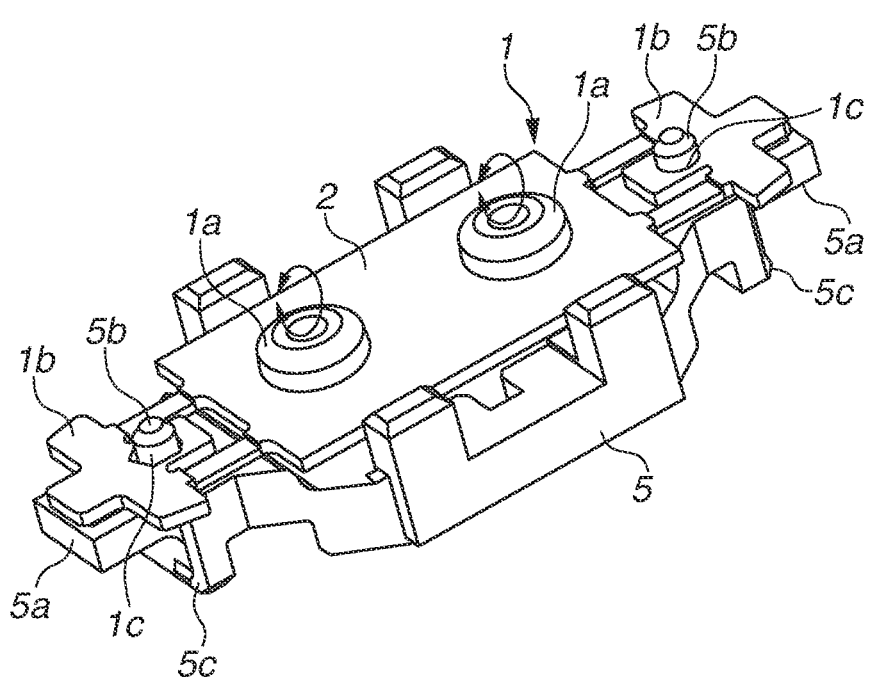
FIG. 3 is a perspective view illustrating a state where a vibrator is held by a holding member.
Figure 4:
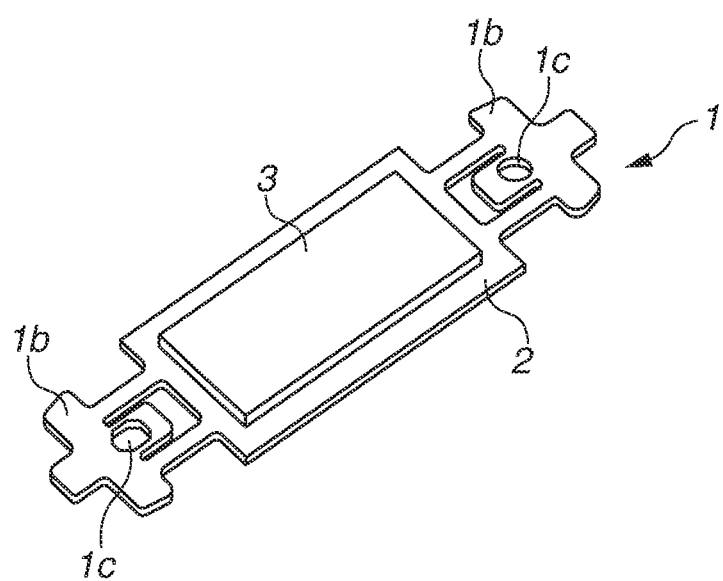
FIG. 4 is a perspective view illustrating the vibrator.

FIG. 3 is a perspective view illustrating the state where the vibrator 1 is held by the holding member 5, as viewed from the side where the vibrator 1 is brought into contact with the friction member 4. FIG. 4 is a perspective view illustrating the vibrator 1, as viewed from the side where the piezoelectric element 3 is joined to the vibrator 1.

As illustrated in FIG. 4, the piezoelectric element 3 is joined by bonding to one surface of the vibrating body 2. The piezoelectric element 3 is obtained by laminating and integrating a plurality of piezoelectric element films.

Further, as illustrated in FIG. 3, on the other surface of the vibrating body 2, two contact portions 1a (protruding portions) are provided, which are arranged in the longitudinal direction of the vibrating body 2. The contact portions 1a are brought into contact with the friction contact surface 4a of the friction member 4.

In both end portions in the longitudinal direction of the vibrating body 2, arm portions 1b are formed. The contact portions 1a are placed between the pair of arm portions 1b. As illustrated in FIG. 3, the pair of arm portions 1b of the vibrator 1 are joined by bonding or welding to boss-like joining portions 5a in both end portions in the longitudinal direction of the holding member 5. The arm portions 1b function to elastically support the vibrator 1 to vibrate. Holes 1c are formed in the arm portions 1b. Projection portions 5b, which are provided in the holding member 5, are inserted into the holes 1c, thereby positioning the vibrator 1 and the holding member 5.

In the vibrator 1, a desired alternating current voltage is applied to the piezoelectric element 3 to excite the piezoelectric element 3, thereby exciting the vibrating body 2, to which the piezoelectric element 3 is joined, in two vibration modes. At this time, a setting is made so that the vibration phases of the two vibration modes have a desired phase difference, whereby elliptic motions as indicated by arrows in FIG. 3 are generated in the contact portions 1a. The elliptic motions are thus generated in the contact portions 1a and transmitted to the friction contact surface 4a of the friction member 4, whereby it is possible to move the vibrator 1 and the friction member 4 relative to each other in the driving direction A. The vibrator 1 is driven on the above principle, and the elliptic motions of the contact portions 1a are generated more efficiently, thereby achieving an ultrasonic motor having a high driving efficiency. Thus, the arm portions 1b are placed away at a predetermined distance or more from the contact portions 1a to disturb elliptic drive generated in the contact portions 1a as little as possible.

Figure 5:
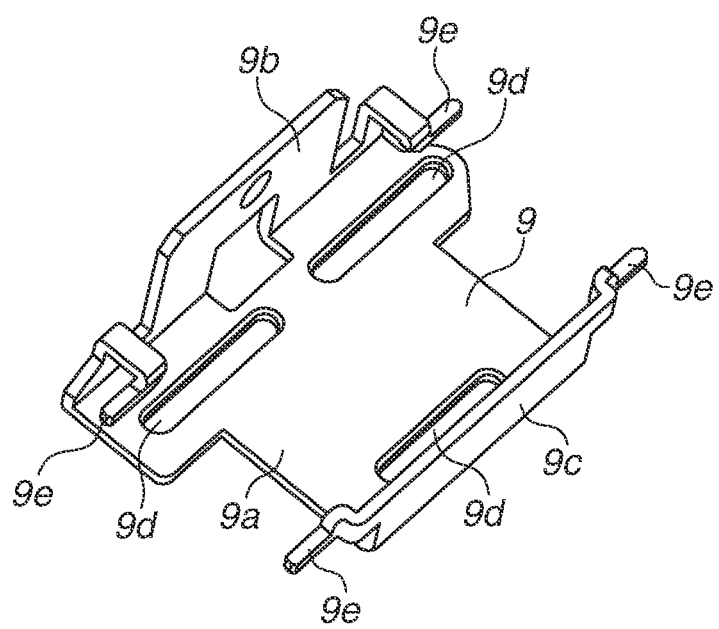
FIG. 5 is a perspective view illustrating a guide member.
Figure 6:
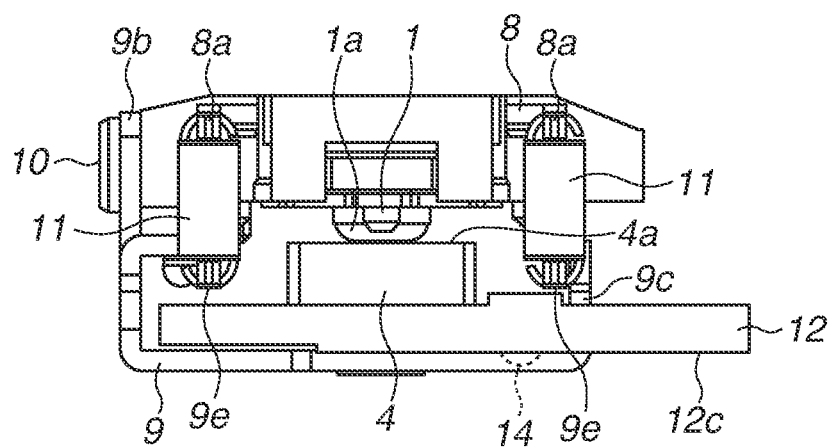
FIG. 6 is a side view of the ultrasonic motor according to the first exemplary embodiment, as viewed from a direction orthogonal to a driving direction of the ultrasonic motor.
Figure 7:
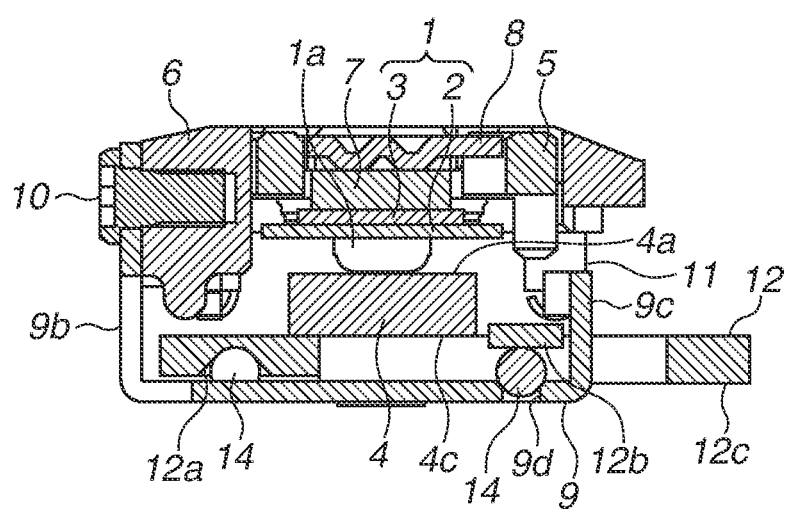
FIG. 7 is a cross-sectional view of the ultrasonic motor according to the first exemplary embodiment, taken along a direction orthogonal to the driving direction.

FIG. 5 is a perspective view illustrating the guide member 9. FIG. 6 is a side view of the ultrasonic motor according to the first exemplary embodiment, as viewed from a direction orthogonal to the driving direction A. FIG. 7 is a cross-sectional view of the ultrasonic motor according to the first exemplary embodiment, taken along a direction orthogonal to the driving direction A.

As illustrated in FIG. 5, the guide member 9 includes a bottom surface 9a and the pair of wall portions 9b and 9c, which are opposed to each other. In the bottom surface 9a, elongated hole-like guide grooves 9d, which extend in the driving direction A, are formed in three places. Near the upper openings of the guide grooves 9d, V-shaped slopes are formed.

Further, as illustrated in FIG. 7, in the base member 12, V-shaped groove portions 12a and a planar guide portion 12b are provided corresponding to the guide grooves 9d of the guide member 9.

Three balls 14 are provided corresponding to the guide grooves 9d. The balls 14 are sandwiched in a rollable manner between the guide grooves 9d of the guide member 9 and the groove portions 12a and the guide portion 12b of the base member 12 by the biasing forces of the tension springs 11. Consequently, the guide member 9 and the base member 12, i.e., the unit including the vibrator 1 and the friction member 4 and the base member 12, can move relative to each other by being guided in the driving direction A.

Near each corner portion of the pressure member 8, a hitch portion 8a is provided, with which to engage a hook at one end of a tension spring 11. Further, near each corner portion of the guide member 9, a hitch portion 9e is provided, with which to engage a hook at the other end of a tension spring 11. Four tension springs 11 are disposed around the contact portions 1a of the vibrator 1 as in the present exemplary embodiment, whereby it is possible to bring the contact portions 1a into contact with the friction contact surface 4a of the friction member 4 with approximately uniform pressure forces.

The configuration for supporting the friction member 4 is described. As illustrated in FIG. 2, the friction member 4 abuts the base member 12 on the back surface 4b. In both end portions in the longitudinal direction of the friction member 4, fastening holes 4c (fixing portions) are formed, which are screw holes into which the male screws 13 (fastening members) are inserted to fasten the friction member 4. Further, in the base member 12, insertion holes 12d are formed at positions corresponding to the fastening holes 4c. The male screws 13 are inserted through the insertion holes 12d of the base member 12 from the back surface 12c side of the base member 12 and inserted into the fastening holes 4c from the back surface 4b side of the friction member 4, thereby fastening and fixing the friction member 4. Thus, heads (screw heads) 13a of the male screws 13 are located on the back surface 12c side of the base member 12.

Figure 8:
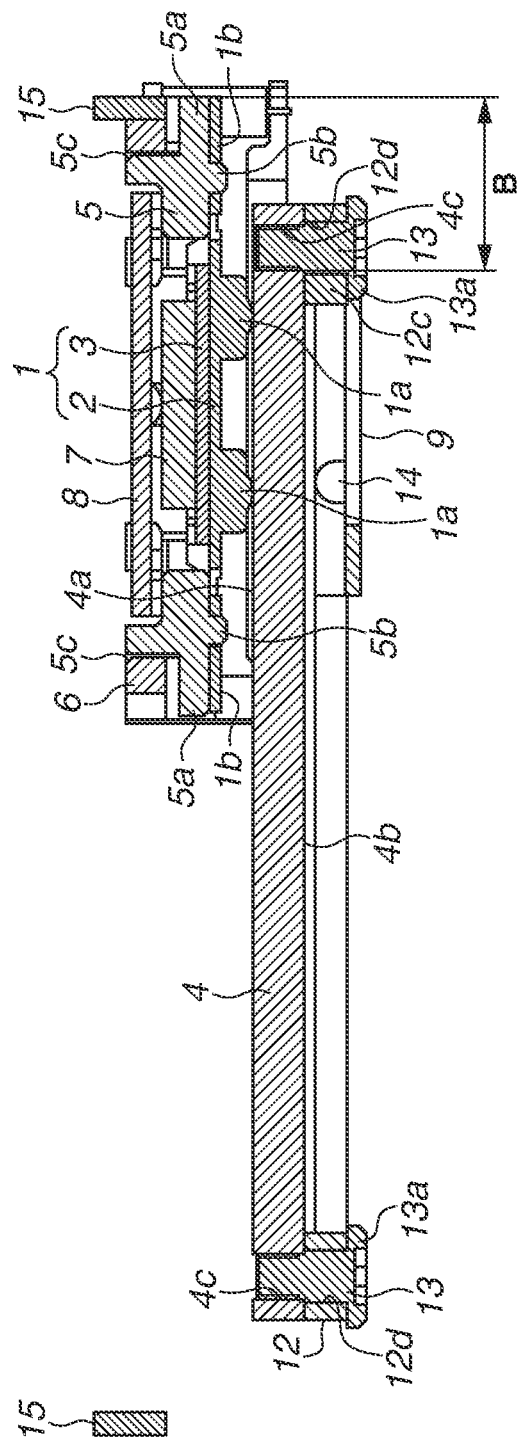
FIG. 8 is a cross-sectional view of the ultrasonic motor according to the first exemplary embodiment, taken along the driving direction.

FIG. 8 is a cross-sectional view of the ultrasonic motor according to the first exemplary embodiment, taken along the driving direction A and illustrates a state after the vibrator 1 and the friction member 4 move relative to each other by the largest amount. On both sides in the driving direction A, driving end members 15 are placed, which define the range of movement of the relative movements of the vibrator 1 and the friction member 4. The unit including the vibrator 1 abuts the driving end members 15 (i.e., the power transmission member 6 abuts the driving end members 15 in the present exemplary embodiment), thereby restricting the further relative movements of the vibrator 1 and the friction member 4.

The fastening holes 4c of the friction member 4 are placed so that in a state after the vibrator 1 and the friction member 4 thus move relative to each other by the largest amount, each fastening hole 4c is located between one of the contact portions 1a of the vibrator 1 and one of the outermost portions in the driving direction A of the unit including the vibrator 1 (an area B in FIG. 8). That is, the vibrator 1 can move to the position where at least part of the vibrator 1 and one of the fastening holes 4c overlap each other in a pressure direction. In the present exemplary embodiment, the outermost portions in the driving direction A of the vibrator 1 coincide with the outermost portions in the driving direction A of the unit including the vibrator 1. As described above, since the arm portions 1b are placed away at the predetermined distance or more from the contact portions 1a in the vibrator 1, the area B is a space necessary to support the vibrator 1. In the space thus necessary to support the vibrator 1, a space for fixing the friction member 4 can be secured. This enables downsizing of the driving direction A.

Further, each of the heads 13a of the male screws 13 has a larger diameter than those of other parts. However, since the heads 13a are located on the back surface 12c side of the base member 12, the heads 13a do not interfere with the contact portions 1a of the vibrator 1. Thus, it is possible to move the contact portions 1a close to the fastening holes 4c. This enables downsizing of the driving direction A.

A second exemplary embodiment is described below. The second exemplary embodiment is an example where the shapes of the fastening holes 4c of the friction member 4 are changed. The basic configuration of the ultrasonic motor is as described in the first exemplary embodiment. The differences from the first exemplary embodiment are mainly described below, and components similar to those of the first exemplary embodiment are designated by the same numerals, and are not described here.

Figure 9:
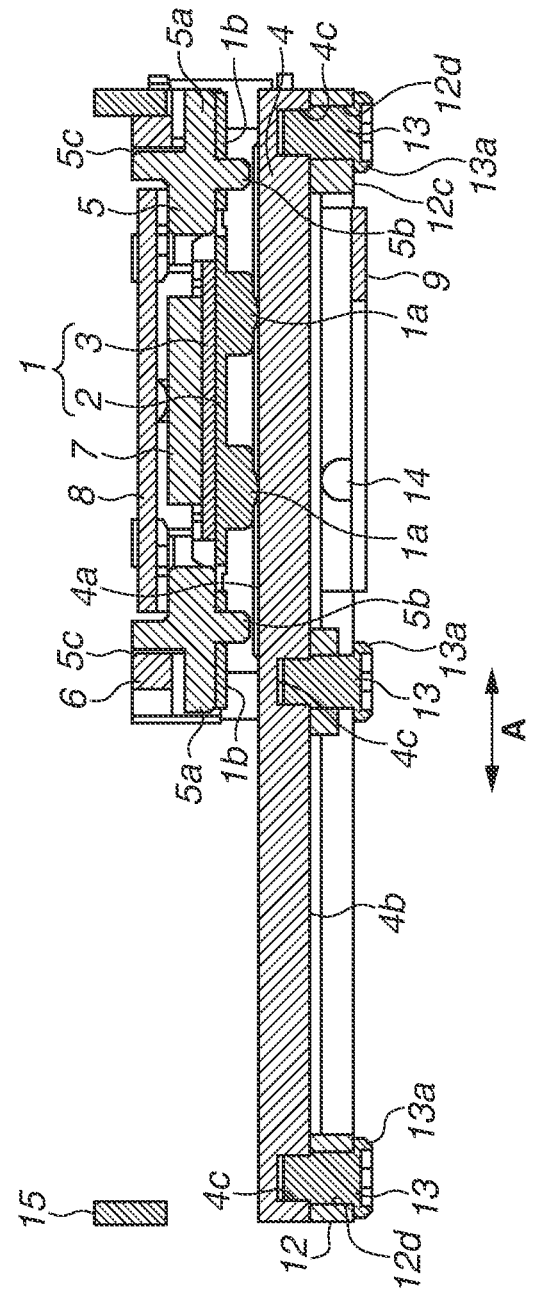
FIG. 9 is a cross-sectional view of an ultrasonic motor according to a second exemplary embodiment, taken along a driving direction of the ultrasonic motor.

FIG. 9 is a cross-sectional view of the ultrasonic motor according to the second exemplary embodiment, taken along the driving direction A and illustrates a state after the vibrator 1 and the friction member 4 move relative to each other by the largest amount.

In the first exemplary embodiment, the fastening holes 4c are so shaped as to open on the back surface 4b and penetrate to the friction contact surface 4a. In the second exemplary embodiment, the fastening holes 4c are so shaped as to open on the back surface 4b and not to penetrate to the friction contact surface 4a.

The fastening holes 4c do not penetrate to the friction contact surface 4a, so that the contact portions 1a of the vibrator 1 can pass directly over the fastening holes 4c while being in contact with the friction contact surface 4a. Thus, it is possible to increase the degree of freedom in the positions of the fastening holes 4c.

In the present exemplary embodiment, the fastening holes 4c are provided in three places in the longitudinal direction of the friction member 4, more specifically, in both end portions in the longitudinal direction of the friction member 4 and also at a middle position between both end portions. In the friction member 4, sound may be produced due to resonance with an ultrasonic vibration generated by the vibrator 1. To avoid this, the resonant frequency of the friction member 4, which is determined according to the thickness, the width, the length, and the material of the friction member 4, needs to be different from the frequency of the ultrasonic vibration generated by the vibrator 1. The degree of freedom in the positions of the fastening holes 4c is increased, whereby it is possible to dispose vibration nodes in the friction member 4 by increasing the number of fastening holes 4c. Thus, the degree of freedom in shape increases, and this can prevent the production of sound.

A third exemplary embodiment is described below. The third exemplary embodiment is an example where the male screws 13 function as driving end members. The basic configuration of the ultrasonic motor is as described in the first exemplary embodiment. The differences from the first exemplary embodiment are mainly described below, and components similar to those of the first exemplary embodiment are designated by the same numerals, and are not described here.

Figure 10:
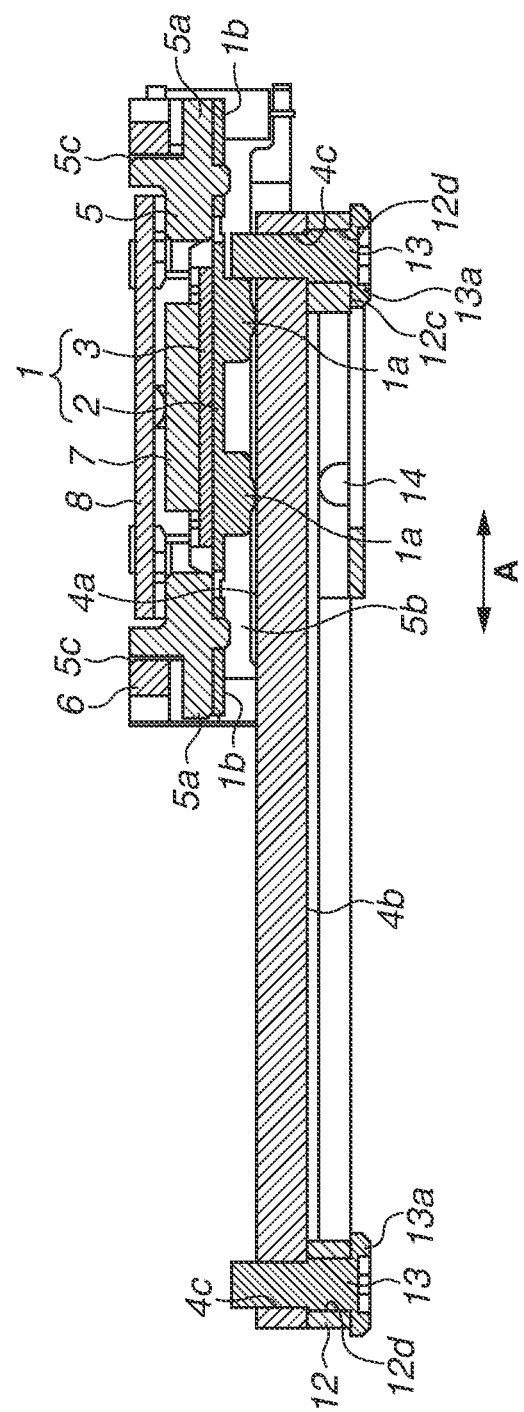
FIG. 10 is a cross-sectional view of an ultrasonic motor according to a third exemplary embodiment, taken along a driving direction of the ultrasonic motor.

FIG. 10 is a cross-sectional view of the ultrasonic motor according to the third exemplary embodiment, taken along the driving direction A and illustrates a state after the vibrator 1 and the friction member 4 move relative to each other by the largest amount.

In the third exemplary embodiment, the male screws 13 are used as driving end members such that extremity portions of the male screws 13 inserted into the fastening holes 4c protrude from the friction contact surface 4a. That is, one of the contact portions 1a of the vibrator 1 abuts one of the extremity portions of the male screws 13, thereby restricting the further relative movements of the vibrator 1 and the friction member 4. This eliminates the need to separately provide the driving end members 15 as in the first and second exemplary embodiments. This enables downsizing accordingly.

A fourth exemplary embodiment is described below. The fourth exemplary embodiment is an example where the structure for fastening the friction member 4 and the base member 12 is changed. The basic configuration of the ultrasonic motor is as described in the first exemplary embodiment. The differences from the first exemplary embodiment are mainly described below, and components similar to those of the first exemplary embodiment are designated by the same numerals, and are not described here.

Figure 11:
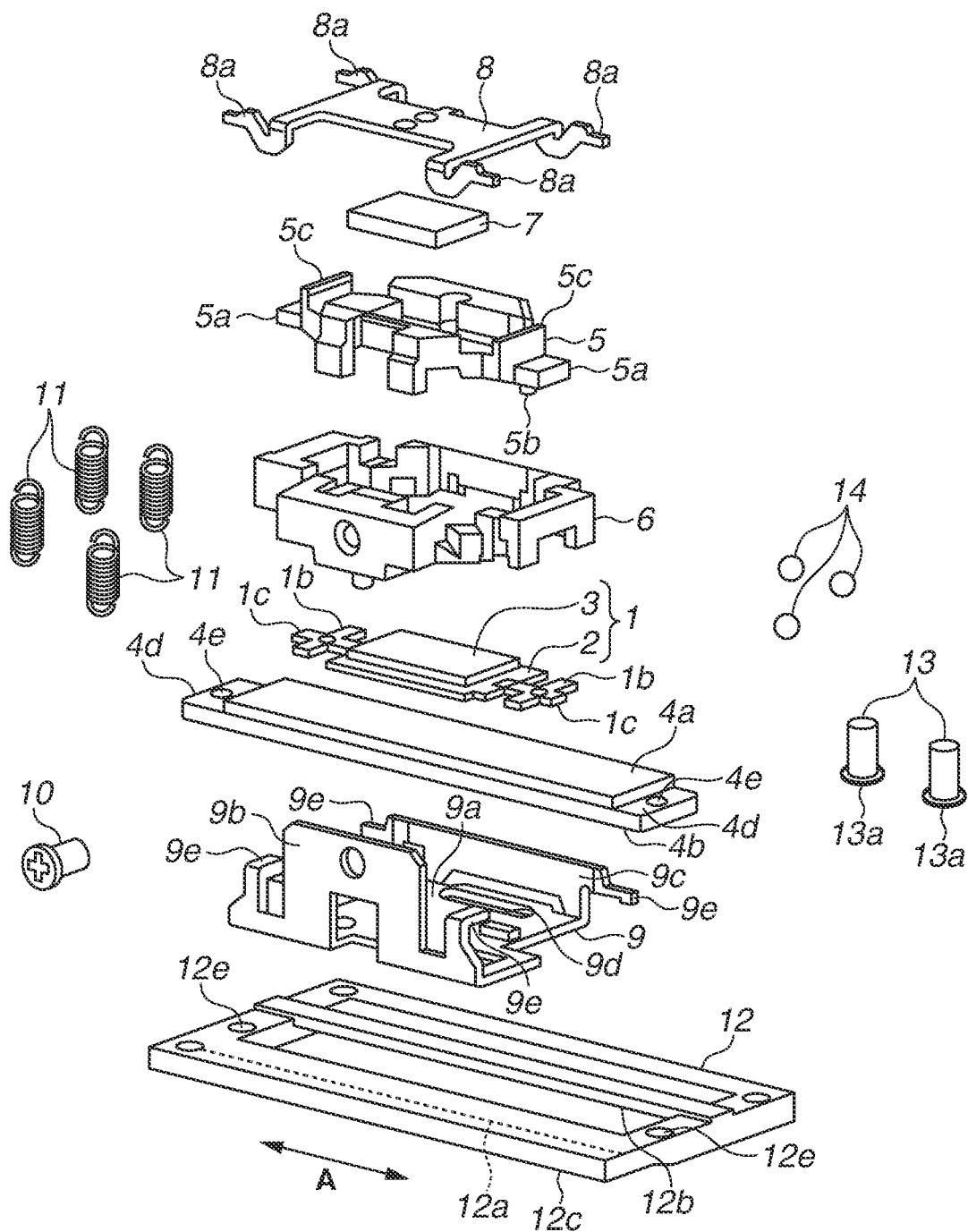
FIG. 11 is an exploded perspective view illustrating an ultrasonic motor according to a fourth exemplary embodiment.
Figure 12:
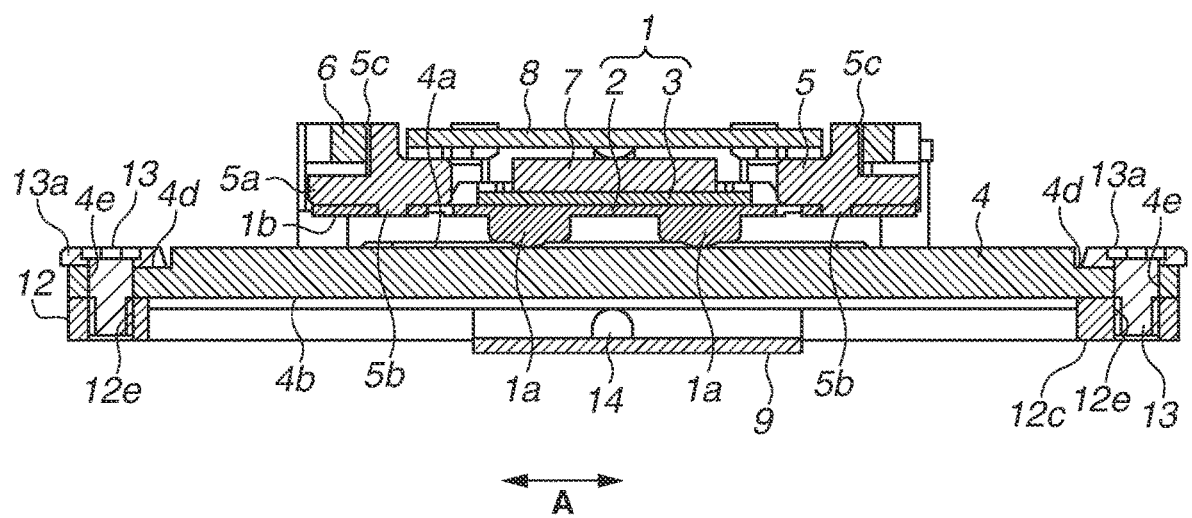
FIG. 12 is a cross-sectional view of the ultrasonic motor according to the fourth exemplary embodiment, taken along a driving direction of the ultrasonic motor.
Figure 13:
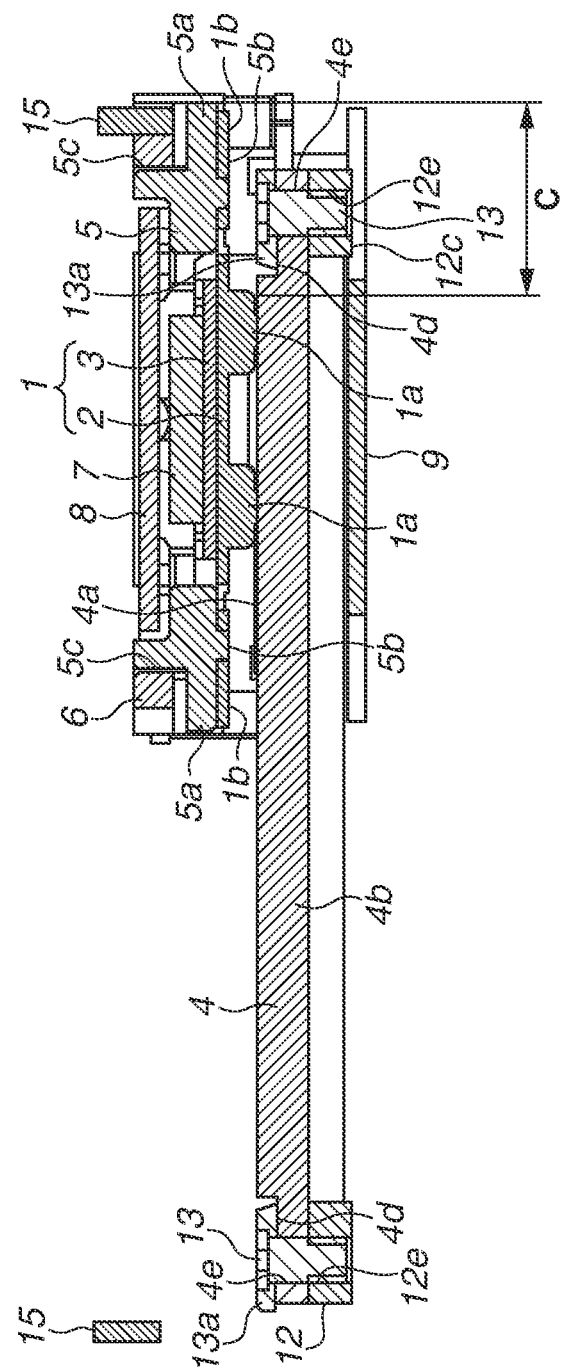
FIG. 13 is a cross-sectional view of the ultrasonic motor according to the fourth exemplary embodiment, taken along the driving direction.

FIG. 11 is an exploded perspective view schematically illustrating an ultrasonic motor, which is a vibration wave motor, according to the fourth exemplary embodiment. FIGS. 12 and 13 are cross-sectional views of the ultrasonic motor according to the fourth exemplary embodiment, taken along a driving direction A.

In the first to third exemplary embodiments, the configurations have been such that the heads 13a of the male screws 13 are located on the back surface 12c side of the base member 12. In the fourth exemplary embodiment, the configuration is such that the insertion directions of the male screws 13 are changed, and the heads 13a of the male screws 13 are located on the friction contact surface 4a side of the friction member 4.

In both end portions in the longitudinal direction of the friction member 4, planar portions 4d (third surfaces) are provided, which are different from the friction contact surface 4a and the back surface 4b. Specifically, in both end portions in the longitudinal direction of the friction member 4, the planar portions 4d are formed at positions one step lower than the friction contact surface 4a. That is, the planar portions 4d are placed between the friction contact surface 4a and the back surface 4b.

In the planar portions 4d, insertion holes 4e are formed, through which the male screws 13 are inserted. The fastening holes 4c in the first to third exemplary embodiments are screw holes for fastening the male screws 13, whereas the insertion holes 4e in the fourth exemplary embodiment are through holes not having threaded shapes through which the male screws 13 are inserted. Further, in the base member 12, fastening holes 12e are formed at positions corresponding to the insertion holes 4e. The insertion holes 12d in the first to third exemplary embodiments are through holes not having threaded shapes through which the male screws 13 are inserted, whereas the fastening holes 12e in the fourth exemplary embodiment are screw holes for fastening the male screws 13. The insertion holes 4e and 12d are through holes not having threaded shapes, but may be through holes having threaded shapes.

As illustrated in FIG. 12, the friction member 4 abuts the base member 12 on the back surface 4b. The male screws 13 are inserted through the insertion holes 4e of the planar portions 4d from the friction contact surface 4a side of the friction member 4 and inserted into the fastening holes 12e of the base member 12, thereby fastening and fixing the friction member 4. Thus, the heads 13a of the male screws 13 are located on the friction contact surface 4a side of the friction member 4 and abut the planar portions 4d. As described above, in the friction member 4, the length in a pressure direction of a portion around the position where each insertion hole 4e is provided is shorter than the length in the pressure direction of the position of the friction contact surface 4a, which is the position where the friction member 4 comes into contact with the vibrator 1.

FIG. 13 illustrates a state after the vibrator 1 and the friction member 4 move relative to each other by the largest amount. The insertion holes 4e of the friction member 4 and the heads 13a of the male screws 13 are placed so that in a state after the vibrator 1 and the friction member 4 thus move relative to each other by the largest amount, each insertion hole 4e and each head 13a are located between one of the contact portions 1a of the vibrator 1 and one of the outermost portions in driving direction A of the unit including the vibrator 1 (an area C in FIG. 13). In the present exemplary embodiment, the outermost portions in the driving direction A of the vibrator 1 coincide with the outermost portions in the driving direction A of the unit including the vibrator 1. As described above, since in the vibrator 1, the arm portions 1b are placed away at the predetermined distance or more from the contact portions 1a, the area C is a space necessary to support the vibrator 1. In the space thus necessary to support the vibrator 1, a space for fixing the friction member 4 can be secured. This enables downsizing of the driving direction A.

Further, since the planar portions 4d are placed between the friction contact surface 4a and the back surface 4b, it is possible to reduce the amounts by which the heads 13a of the male screws 13 abutting the planar portions 4d protrude upward above the friction contact surface 4a. That is, the length at which each male screw 13 protrudes from the friction contact surface 4a to the vibrator 1 side is shorter than the length of each contact portion 1a. Consequently, even when the unit including the vibrator 1 has a structure such as the projection portions 5b, which protrude in the direction of the friction contact surface 4a of the friction member 4 (the pressure direction of the pressure member 8), it is possible to secure sufficient clearance from this structure.

(Example Where Ultrasonic Motor is Provided in Optical Device)

Figure 14:
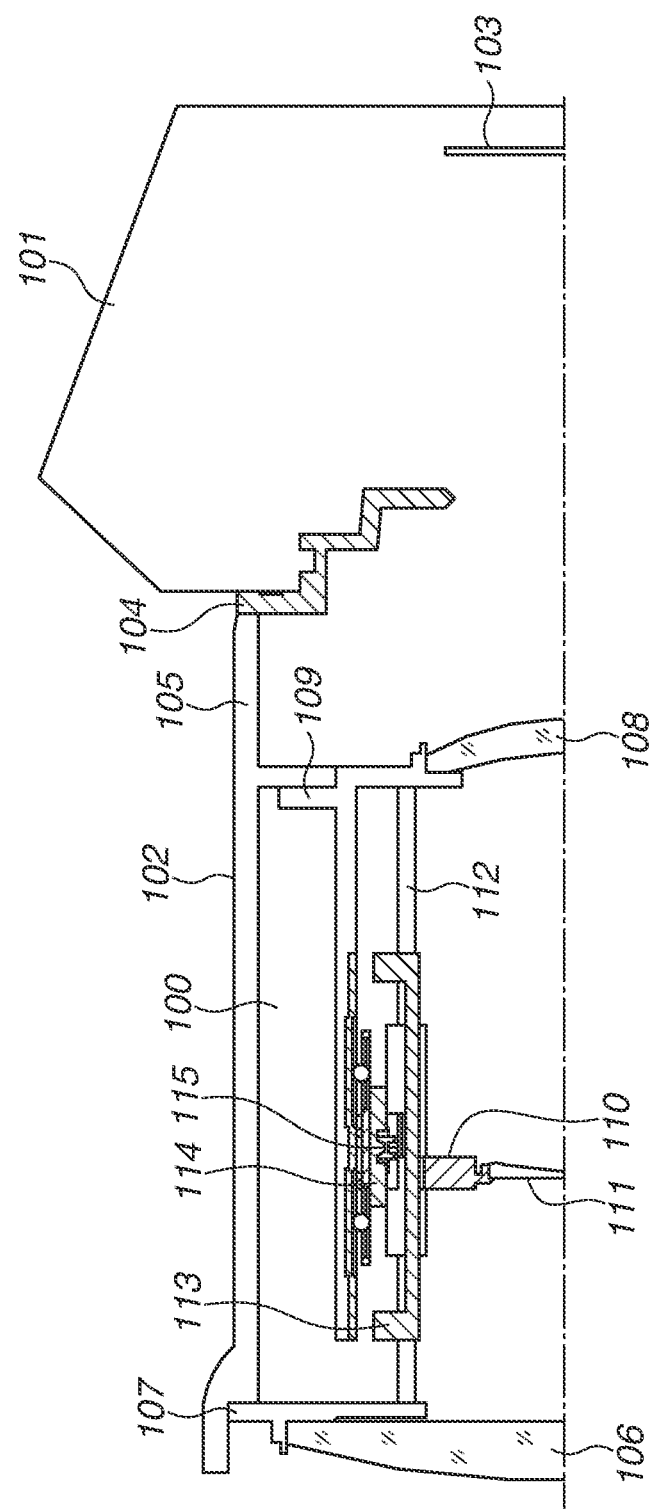
FIG. 14 is a cross-sectional view illustrating a lens barrel in which an ultrasonic motor is provided.

FIG. 14 is a cross-sectional view illustrating a lens barrel, which is an example of an optical device in which an ultrasonic motor is provided. In the present exemplary embodiment, an example is described where an interchangeable lens unit 102, which is replaceable in a camera main body 101, is included in a lens barrel, and an ultrasonic motor 100 functions as a driving source for a focus lens. The interchangeable lens unit (lens barrel) 102 has an approximately rotationally symmetrical shape, and therefore, only the upper half of the interchangeable lens unit 102 is illustrated.

The interchangeable lens unit 102 is detachably attached to the camera main body 101. An image sensor 103 is provided in the camera main body 101, and an object image is formed on the image sensor 103 through the interchangeable lens unit 102.

A mount 104 includes a bayonet portion for attaching the interchangeable lens unit 102 to the camera main body 101. A fixed barrel 105 abuts a flange portion of the mount 104 and is fixed to the mount 104 with a screw (not illustrated). A front lens barrel 107, which holds a lens 106, and a rear lens barrel 109, which holds a lens 108, are fixed to the fixed barrel 105.

A holding frame 110 holds a focus lens 111 and can move straight by a guide bar 112, which is held by the front lens barrel 107 and the rear lens barrel 109.

The ultrasonic motor 100 has a configuration in which if a driving unit 114 is driven, the driving force of the driving unit 114 is transmitted to the holding frame 110 via a driving force transmission portion 115, and the holding frame 110 moves relative to a bottom plate 113.

More specifically, a flange portion is formed in the bottom plate 113 of the ultrasonic motor 100 and fixed to the rear lens barrel 109 with a screw. If the driving unit 114 of the ultrasonic motor 100 is driven, the driving force of the driving unit 114 is transmitted to the holding frame 110 via the driving force transmission portion 115. The holding frame 110 moves in a straight line along the guide bar 112 and moves the focus lens 111, which is a driven member, back and forth.

Although the details of the ultrasonic motor 100 illustrated in FIG. 14 do not necessarily coincide with the ultrasonic motors described in the above exemplary embodiments, the basic configuration and the basic operation of the ultrasonic motor 100 as an ultrasonic motor are not different from those of the ultrasonic motors described in the above exemplary embodiments. The holding frame 110, the driving unit 114, and the driving force transmission portion 115 can be said to be components corresponding to the unit including the vibrator 1 in the above exemplary embodiments. The bottom plate 113 can be said to be a component corresponding to the friction member 4 and the base member 12 in the above exemplary embodiment.

While the present disclosure has been described together with exemplary embodiments, the above exemplary embodiments merely illustrate specific examples for carrying out the present disclosure, and the technical scope of the present invention should not be interpreted in a limited manner based on these exemplary embodiments. That is, the present invention can be carried out in various manners without departing from the technical idea or the main features.

For example, the configuration of the ultrasonic motor illustrated in FIG. 1 is merely an example, and for example, the number and the shapes of components of the unit including the vibrator 1 are not limited to this.

Further, an interchangeable lens unit as a lens barrel has been described as an optical device. The present invention, however, is not limited to this. The optical device may only need to include a driven member that is driven by a vibration wave motor.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-063102, filed Mar. 28, 2017, and No. 2018-006553, filed Jan. 18, 2018, which are hereby incorporated by reference herein in their entirety.

What is claimed is:

1. A vibration wave motor comprising:
    a vibrator including a piezoelectric element and a vibrating body;
    a friction member including a first surface configured to come into contact with the vibrator, and a second surface, which is a surface on the opposite side of the first surface, the vibrator and the friction member moving relative to each other in a driving direction by a vibration generated by the vibrator;
    a supporting member configured to support the friction member on the second surface side; and
    a fastening member configured to fix the friction member and the supporting member;
    a pressure member configured to bring the vibrator and the friction member into pressure contact with each other,
    wherein in the driving direction, the first surface is longer than the vibrator,
    wherein the friction member includes a fixing portion having a hole shape to fix the friction member to the supporting member,
    wherein the fastening member is inserted into the fixing portion to fix the friction member and the supporting member, and
    wherein the vibrator is moveable to a position where at least part of the vibrator and the fastening member overlap each other in a pressure direction of the pressure member.

2. The vibration wave motor according to claim 1, wherein the fastening member is inserted into the fixing portion from the second surface side to fix the friction member and the supporting member.

3. The vibration wave motor according to claim 1, wherein the fastening member is inserted into the fixing portion from the first surface side to fix the friction member and the supporting member.

4. The vibration wave motor according to claim 3, wherein in the friction member, a length in the pressure direction of a portion around a position where the fixing portion is provided is shorter than a length in the pressure direction of a position where the friction member comes into contact with the vibrator.

5. The vibration wave motor according to claim 4,
    wherein in the vibrator, a protruding portion protruding in the pressure direction comes into contact with the friction member, and
    wherein in the pressure direction, a length at which the fastening member protrudes from the first surface to the vibrator side is shorter than a length of the protruding portion.

6. The vibration wave motor according to claim 1, further comprising a holding member configured to hold the vibrator,
    wherein the vibrator includes a pair of arm portions held by the holding member, and
    wherein the vibrator is moveable to a position where the pair of arm portions overlap the fixing portion in the pressure direction.

7. An optical device comprising:
    a vibrator including a piezoelectric element and a vibrating body;
    a friction member configured to come into contact with the vibrator, the vibrator and the friction member moving relative to each other in a driving direction by a vibration generated by the vibrator;
    a supporting member configured to support the friction member;
    a fastening member configured to fix the friction member and the supporting member;
    a pressure member configured to bring the vibrator and the friction member into pressure contact with each other, and
    a driven body configured to be driven by relatively moving the vibrator and the friction member,
    wherein in the driving direction, the first surface is longer than the vibrator,
    wherein the friction member includes a fixing portion having a hole shape to fix the friction member to the supporting member, and
    wherein the fastening member is inserted into the fixing portion to fix the friction member and the supporting member,
    wherein the vibrator is moveable to a position where at least part of the vibrator and the fastening member overlap each other in a pressure direction of the pressure member.

8. The optical device according to claim 7,
    wherein the optical device is an interchangeable lens replaceable in a camera, and
    wherein the driven body is a lens.

* * * * *